United States Patent
Dalrymple

(10) Patent No.: US 7,046,771 B2
(45) Date of Patent: May 16, 2006

(54) METHOD AND APPARATUS FOR INTERNET PROTOCOL VOICE BASED TELEPHONY COMMUNICATION

(75) Inventor: Derek K. Dalrymple, Chicago, IL (US)

(73) Assignee: Oracle International Corp., Redwood Shores, CA (US)

( * ) Notice: Subject to any disclaimer, the term of this patent is extended or adjusted under 35 U.S.C. 154(b) by 0 days.

(21) Appl. No.: 10/161,124

(22) Filed: May 31, 2002

(65) Prior Publication Data

US 2003/0223553 A1  Dec. 4, 2003

(51) Int. Cl.
*H04M 1/64* (2006.01)
(52) U.S. Cl. .................... 379/88.17; 370/355; 370/401
(58) Field of Classification Search ............ 379/88.17, 379/88.25, 93.09; 370/300, 471, 395.52, 370/395.54, 395.63, 395.64; 709/231, 232, 709/233; 309/231
See application file for complete search history.

(56) References Cited

U.S. PATENT DOCUMENTS

| | | | | |
|---|---|---|---|---|
| 5,410,671 A | * | 4/1995 | Elgamal et al. ............. | 711/202 |
| 5,915,001 A | * | 6/1999 | Uppaluru .................. | 379/88.22 |
| 6,088,733 A | * | 7/2000 | Kikuchi ...................... | 709/231 |
| 6,199,076 B1 | * | 3/2001 | Logan et al. ............ | 715/501.1 |
| 6,282,269 B1 | * | 8/2001 | Bowater et al. ......... | 379/88.17 |
| 6,370,536 B1 | * | 4/2002 | Suzuki et al. ............... | 707/101 |
| 6,546,427 B1 | * | 4/2003 | Ehrlich et al. ............. | 709/231 |
| 6,775,372 B1 | * | 8/2004 | Henits ........................ | 379/219 |
| 2002/0013725 A1 | * | 1/2002 | Takakura et al. ............. | 705/10 |

FOREIGN PATENT DOCUMENTS

WO  WO 00/3840  1/2000

* cited by examiner

*Primary Examiner*—Fan Tsang
*Assistant Examiner*—Simon P. Sing
(74) *Attorney, Agent, or Firm*—McDonald Hopkins, Co., LPA

(57) ABSTRACT

A method of providing a sound file to a voice gateway for coupling the voice gateway to a receiver via a voice based telephony connection. The method includes the steps of establishing a connection to the voice gateway, dividing the sound file into smaller files with a reduced size, altering the sound file header to reflect the smaller files size. The altered file header is attached at the beginning of the smaller files. The smaller files are converted into a format usable by the voice gateway. The converted smaller files are then coupled through to the voice gateway, for playback by a user.

22 Claims, 6 Drawing Sheets

METHOD AND APPARATUS FOR INTERNET PROTOCOL VOICE BASED TELEPHONY COMMUNICATION

BACKGROUND

The invention relates, generally, to Internet based media, and more particularly to novel methods and apparatus for providing sound files to voice gateways for coupling to voice based telephony channels.

Audio signals are available through the Internet typically in the form of streaming broadcast of radio, recorded music, etc. These audio signals are typically downloaded from an Internet signal source via the user's Internet service provider through a modem to a computer. Internet media includes traditional broadcast services, such as radio stations in a multitude of content types (news, sports, music, etc . . . ). An increasing number of such stations have been establishing their own websites. These websites can be located using conventional web browsers to request specific audio files from either live or recorded audio programs. Internet radio systems make it possible to download an increasingly diverse selection of audio programs, including specific specialized programs not available from conventional broadcast media.

However the use of a visual web browser to seek, locate, and then play desired programs is currently unsuitable for use by a land line or cellular phone receiver. Thus, the majority of all media on the Internet is not available over the phone channels (land line or cellular). Such phone communication is complicated by the fact that each media type typically uses a different format. For example, two such media are MP3 and RealAudio files, each having a different specific format. Voice Gateways are commonly used to bridge the gap between the voice telephony channel and the Internet and they typically only utilize one type of audio file format that is not the format of the Internet media. Typically, in the U.S. the common format is µlaw (also commonly written as Mulaw). The problem is that the formats used by the Voice Gateways are incompatible with the format typically used by the Internet media. Thus conversion is required to couple many of the Internet media over a voice telephony connection.

A need, therefore, exists for a solution that provides a user access to the full variety of Internet media including such sources as MP3 and streaming RealAudio files to the on-the-move user via a voice based telephony connection.

SUMMARY OF INVENTION

In one embodiment a method of providing a sound file to a voice gateway for coupling to a receiver via a voice based telephony connection is described in which a connection to the voice gateway is established and the original sound file is divided into smaller files. The original sound file header is also altered to reflect the smaller file size and then is attached to the smaller files. The smaller files are converted into a format usable by the voice gateway, and the converted smaller files are provided to the voice gateway for playback to the user.

BRIEF DESCRIPTION OF DRAWINGS

The invention, together with the advantages thereof, may be understood by reference to the following description in conjunction with the accompanying figures, which illustrate some embodiments of the invention.

DETAILED DESCRIPTION

Figure 1:
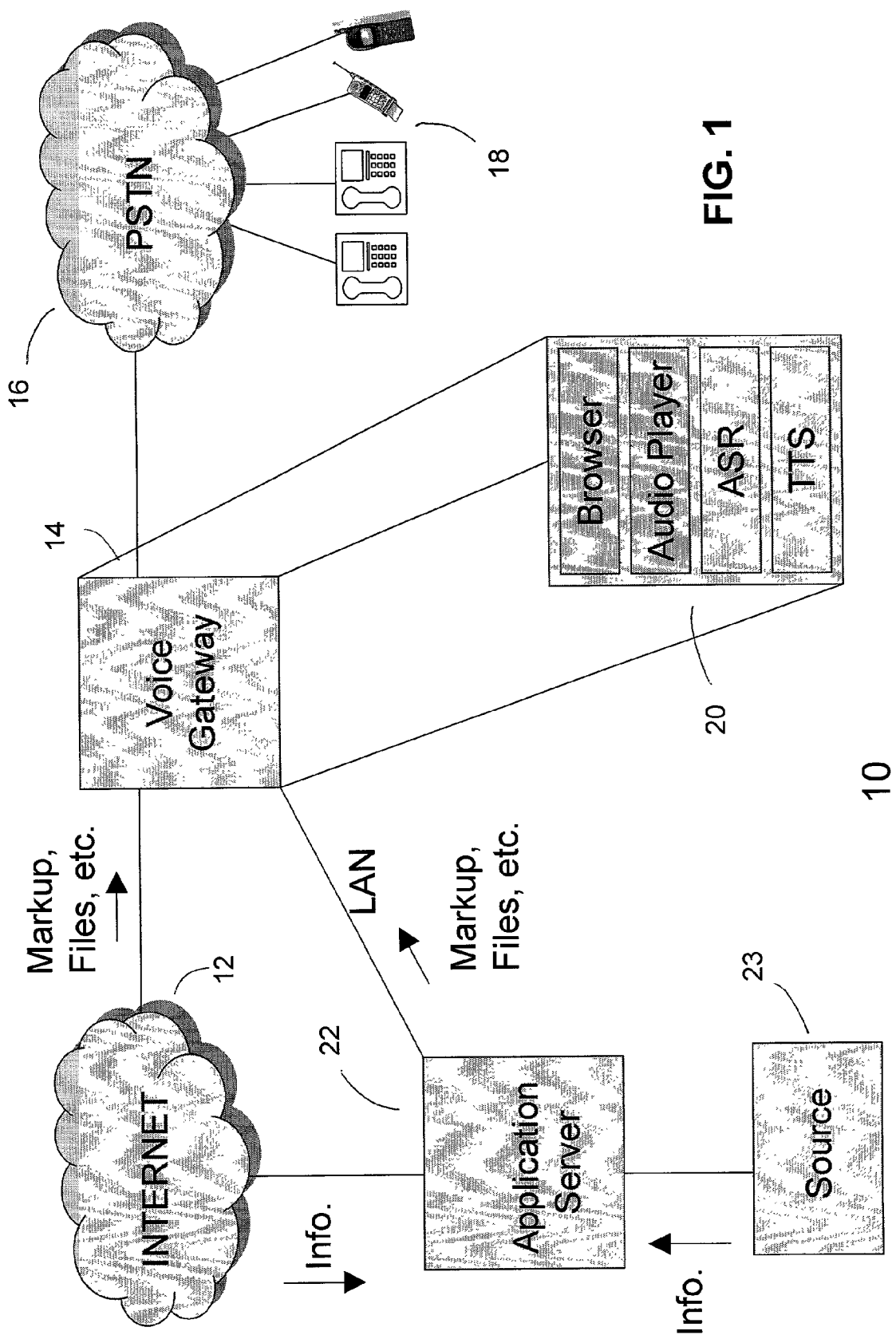
FIG. 1 is a functional block diagram illustrating one embodiment of a communication network connecting the Internet to a telephony receiver.

While the present invention is susceptible of embodiment in various forms, there is shown in the drawings and will hereinafter be described some exemplary and non-limiting embodiments, with the understanding that the present disclosure is to be considered an exemplification of the invention and is not intended to limit the invention to the specific embodiments illustrated.

In this application, the use of the disjunctive is intended to include the conjunctive. The use of definite or indefinite articles is not intended to indicate cardinality. In particular, a reference to "the" object or "a" object is intended to denote also one of a possible plurality of such objects.

FIG. 1 is a functional block diagram illustrating one embodiment of a communication network 10 connecting the Internet 12 or any other suitable network for example an Extranet or Intranet, etc . . . to a receiver, landline, or wireless device 18. The communication network 10 allows an Internet user to make a voice channel connection to the Internet 12 to receive audio communication such as MP3 audio, streaming Real Audio, broadcast radio etc . . . over a voice based telephony communication channel such as PSTN (Public Switch Telephone Network) phone connection, a VoIP (Voice over Internet Protocol) connection, etc. The communication network 10 comprises the Internet network 12 coupled to a voice gateway 14, which is coupled to a PSTN 16, as shown. The PSTN 16 couples the audio communication to a suitable voice receiver 18 such as a landline telephone or wireless phone receiver 18. An application server 22, such as the Oracle 9iAS is coupled, as shown, to the Internet 12 and/or to the voice gateway 14.

The Internet 12 allows a user, using a personal computer or any other Internet capable device, the ability to access many types of information from internet-connected sources. The desired information is maintained for example in web pages delivered upon request from servers. Some web pages are maintained by broadcast services that offer audio programs, both live and archived. These audio programs may be accessed through hyper-links, used, for example, to open a specific part of the web page or another page on the same server. In accessing a hyper link, a connection to a server may be established to select and download a specific live or archived broadcast. The downloaded broadcast could be played on an appropriate electronic device.

Referring to FIG. 1, the voice gateway 14 provides an audio communication bridge between the PSTN 16, and the Internet service provider 12 using a standard format such as a μlaw format. A voice gateway can support a choice of Automated Speech Recognition (ASR), Text-To-Speech (TTS) technologies, browser functionalities (e.g. for connecting to the Internet using standard TCP/IP (Transmission Control Protocol Internet Protocol) protocols to interpret voice data in formats such as Voice XML, SALT, etc . . . and telephony technologies (e.g. to play audio files over the phone). Typically voice gateways can be scaled to accommodate voice applications of any size, and are capable of supporting millions of users.

The PSTN 16 may include a wireless telecommunication network that provides public switched telephone network connectivity, control functions, and switching functions for wireless users, as well as connectivity to voice gateways. The application server 22, such as an Oracle 9iAS, runs a Web site, or Internet application. The application server 22 also allows a Website or an application to be accessible from any browser or mobile device.

This communication network 10 may incorporate a land or wireless communication system to provide a requested program to a landline or wireless phone user. The requested audio program, accessed on the Internet 12, is sent to the voice gateway if it is already provided in a format usable by the voice gateway 14 (e.g. μlaw). Otherwise the requested audio may first be converted to render it suitable for coupling to the voice gateway 14. The voice gateway 14 would then transmit the converted file's audio content to the user, e.g. via a PSTN 16. This conversion involves dividing the original file to a suitable sized file. The reduced size files are then converted to a format compatible with the voice gateway 14, and coupled through the voice gateway 14 to the PSTN 16 and then to the reciever 18.

Another embodiment of a communication network 10 connecting the Internet 12 to a receiver, landline, or wireless device 18, may be used to deliver audio files over the phone using the following 3-step process:

divide->convert->deliver

The "divide" segment of the process involves establishing a link with the server on the Internet that holds the MP3 or RealAudio files. Once the link is established the downloading of the file begins. After an initial portion of an audio file is downloaded, it is stored into a separate file, with a modified header attached which is similar to the original header but represents the new file size.

The "convert" segment of the process begins with the downloaded reduced size file while simultaneously the rest of the original file is being further divided and downloaded into separate storage files. The conversion segment takes the file that has been created by the divide segment and runs it through a series of converters to get it into the appropriate format for the voice gateways. Once the file is converted it is stored into a final file for delivery.

The "deliver" segment of the process involves informing the voice gateway of all the files that are (and will) be available once the entire "divide->convert->deliver" process is completed.

Figure 2:
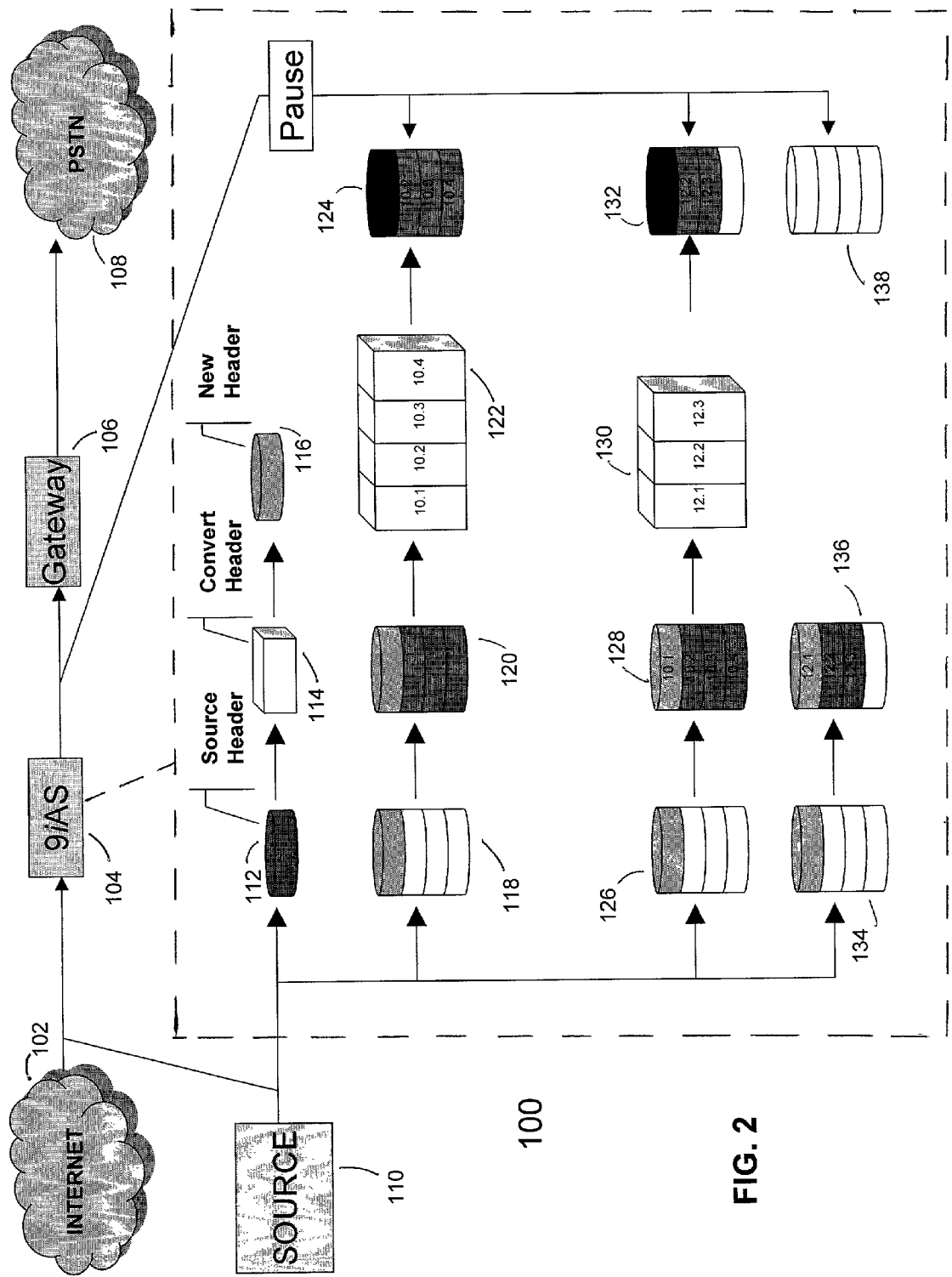
FIG. 2 is a functional block diagram illustrating a specific embodiment of a method of providing a sound file to a voice gateway for coupling to a voice based telephony connection.

FIG. 2 is a functional block diagram 100 of a specific embodiment of a method for providing a sound file to a voice gateway 106 for coupling through the voice gateway 106 to a receiver (not shown) via a voice based telephony connection. A connection is made to an Internet file having a format that is not in a format required by the voice gateway 106 or having a size too large to play immediately and hence would benefit from division. This file can be located on the Internet 102 or on a local or source machine 110, such as a personal computer. Once a successful connection is made, the gateway 106 is informed which files will be produced at the end of the conversion process. This information also may inform the gateway 106 to wait for a predefined period of time before playing the first file, while the original source file is subdivided into files and converted into a format suitable for the gateway 106. This pause is desirable since the system requires a certain amount of time to produce the first converted file.

Most original files have a source header 112 typically at their beginning. This source header 112 defines the file parameters such as the contents of the file, its size, format, sampling rate, number of channels, bits per sample, etc. Since the original file is to be divided into smaller sized files, the source header is saved so that the smaller files have the same description as their original file source. But the source header 112 in the illustrated embodiment may also be processed by a converter in process 114 to reflect the division of the original file into smaller ones. The primary change to the source header 112 is in the portion of the header defining the size of the file. Thus, a new, converted, header 116 is created defining a smaller file size and the converted header is saved. A new file 118 is then created and the new header 116 is affixed to it (e.g. at the beginning). In the illustrated embodiment of FIG. 2, data from the source is downloaded to fill the new file 118 with data. The desired size of the new reduced size may be predetermined or be determined based on any algorithm suitable to the type of data format used by the original file. Once the predefined new file size is reached, two new processes begin. They are the conversion and the download processes.

First, the new reduced file is sent to a conversion routine 122 to be converted to the format usable by the gateway 106. And, since the downloading of data can continue during conversion a subsequent reduced size file 126 can be created and filled while conversion proceeds. As the conversion process takes place on the first file 118, the download process is taking place for the next file 126. Once the conversion process 122 is completed, the converted file 124, which is now in a usable format, is made available to the gateway 106.

When the next file 126 is complete and ready for conversion 122, a new file 134 is prepped for filling, and the process repeats converting files 126 while filling the next files 134. This parallel processing is used to ensure that no time is wasted receiving the file and converting the file. The process continues, filling, converting and transmitting subsequent reduced files until the end of the data from the original source file is reached. Once the last file with data from the original source is done downloading, the original files are removed so that system space is conserved.

The above method may be performed by the application server 22 (such as a Oracle 9iAS) or some other processor using instructions which may reside on a computer-readable medium. The computer-readable medium may be any suitable computer readable storage medium such as, but not limited to random access memory, read-only memory, flash memory, CDROM, DVD, solid-state memory, magnetic memory, and optical memory.

In an embodiment in which the connection is streaming, e.g. live-radio broadcast, the system may perform a different method of file management. This method involves overwriting old files (which have already been played by the gateway) with new information. After a predefined number of files are created, the next new file to be created is actually the first file that was created when the process began. For example, in the embodiment of FIG. 2, file 118 could be filled, followed by file 126, and file 134. Then, while file 126 is coupled to the voice gateway after conversion and while file 136 is being converted, new data may be downloaded into file 118. The process then continues cycling through the available files by converting each in sequence. This method conserves system space and improves efficiency. The voice gateway 106 is also informed of this overwriting process and is instructed to get new copies of the converted files instead of using existing copies of the old ones. While this method is highly suitable for a streaming connection, it can be used with the static connections as well.

Figure 3:
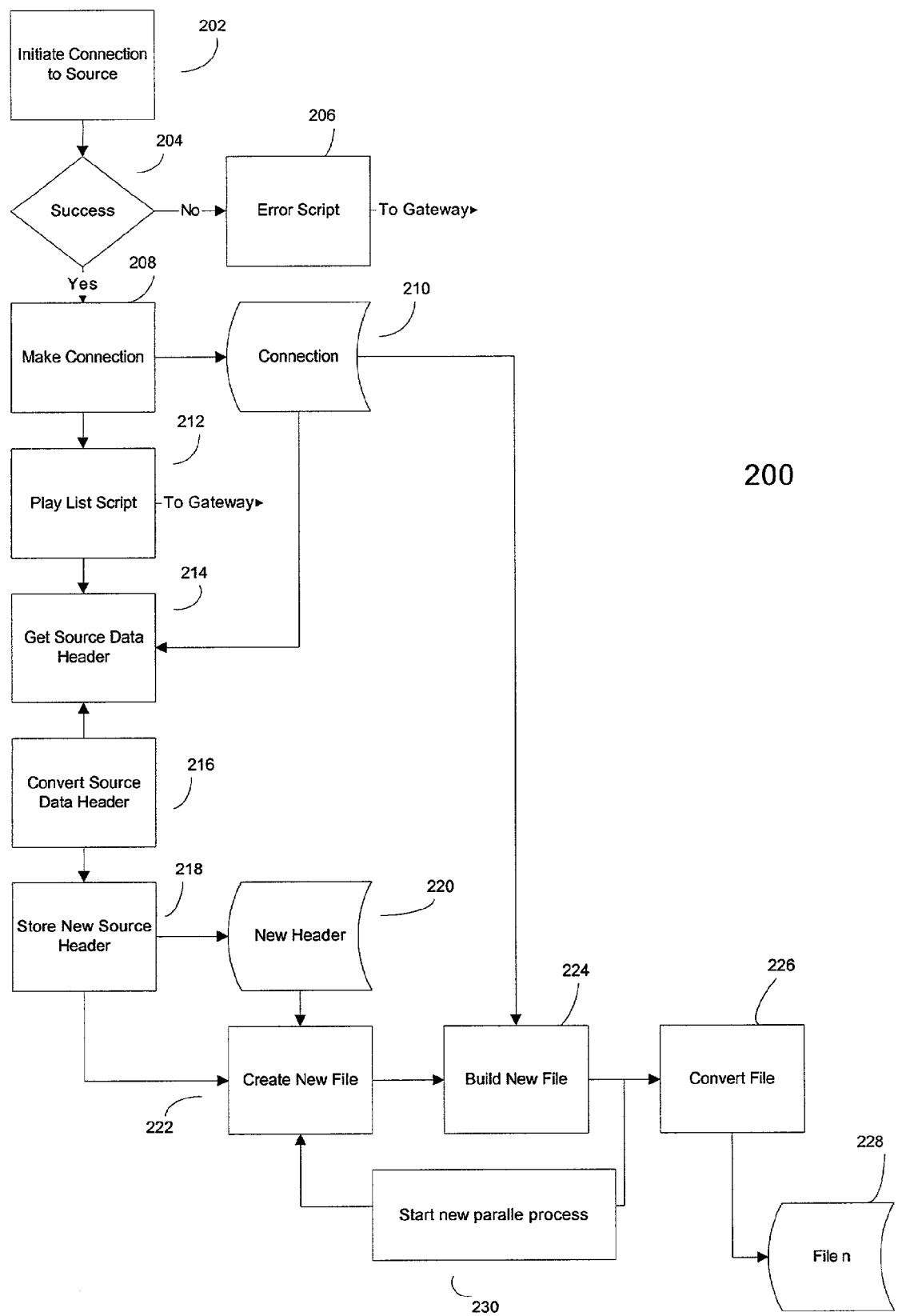
FIG. 3 is a flow chart illustrating one embodiment of a method of connecting to an audio source, converting an audio file, and providing the resulting usable file to a voice gateway.

FIG. 3 is a flow chart 200 detailing the steps of converting an audio file and providing the resulting converted file to a voice gateway. A connection is initiated, from a user, to an Internet audio source as illustrated at 202. The processing branches at 204 to an error script 206 if not successful. Once the connection is established as shown at step 208, then a play list 212 is supplied to a voice gateway informing the voice gateway what files will be coupled to it and then the audio source header is then retrieved as shown at 214.

Once the source header has been retrieved at 214, the conversion of the header begins 216. This conversion is primarily used to modify the portion of the header related to the file size to be used for the reduced size files when the original source file is subdivided into new smaller files. The new header reflects the new predetermined size of the new reduced size files. The new header is stored as indicated at step 218 so that it can be to be affixed to the beginning of each of the new reduced size files.

Once the new reduced size file is created at step 222 and the new header 220 is affixed to it, the process of filling the new file with data commences as illustrated by step 224. When the file is full, the conversion of the new file to a format usable by the voice gateway is performed as illustrated by step 226. The converted file is coupled to the voice gateway and the process continues at 228. The processes of building a subsequent file and converting the preceding file may therefore be performed in parallel, 222, 226. This parallel process continues until the end of the original audio source file is reached.

Figure 4:
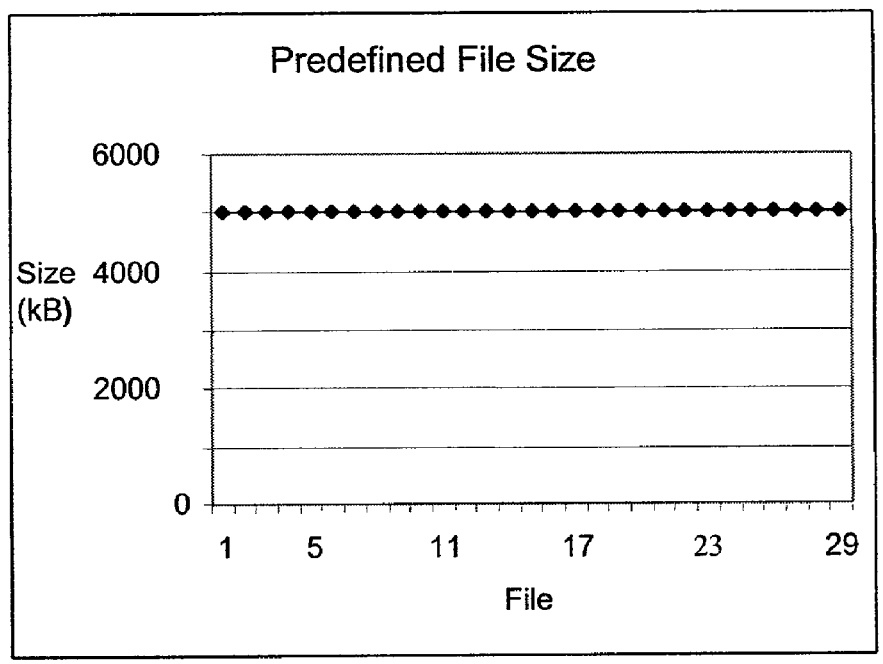
FIG. 4 is a graph illustrating a specific example of an algorithm for a predefined reduced file size.
Figure 5:
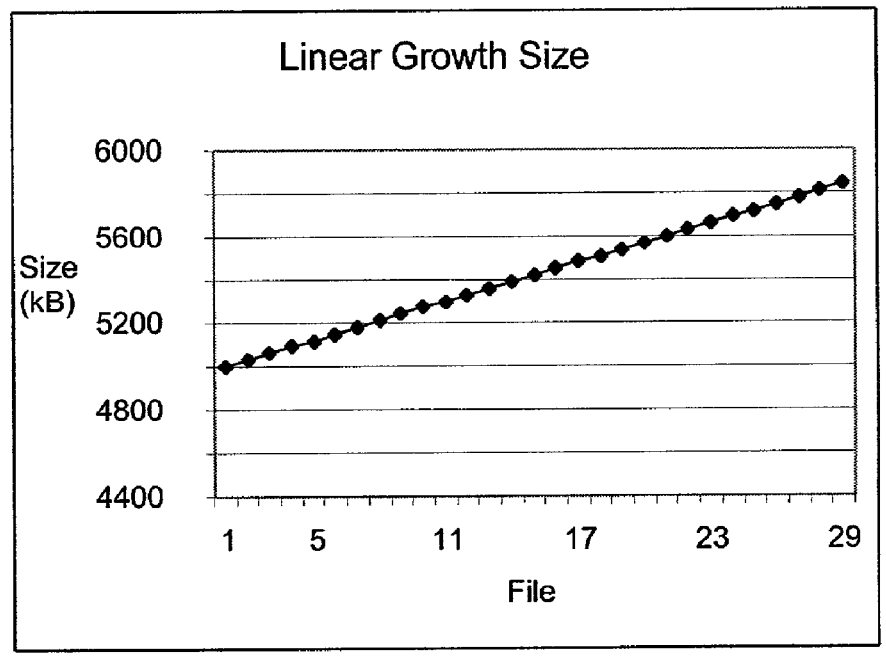
FIG. 5 is a graph illustrating a specific example of an algorithm for a linear growth of the reduced file size.
Figure 6:
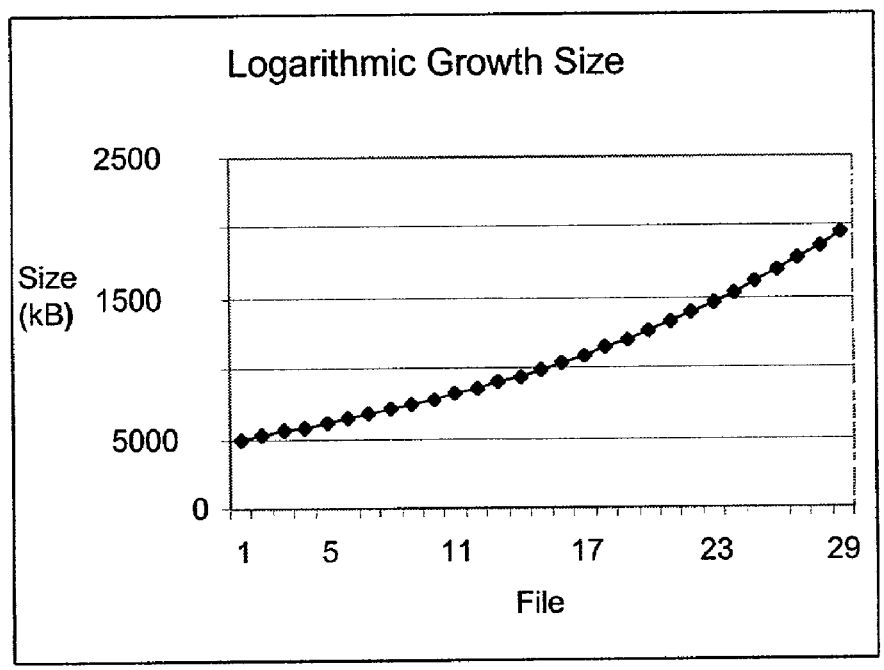
FIG. 6 is a graph illustrating a specific example of an algorithm for a logarithmic growth of the reduced file size.
Figure 7:
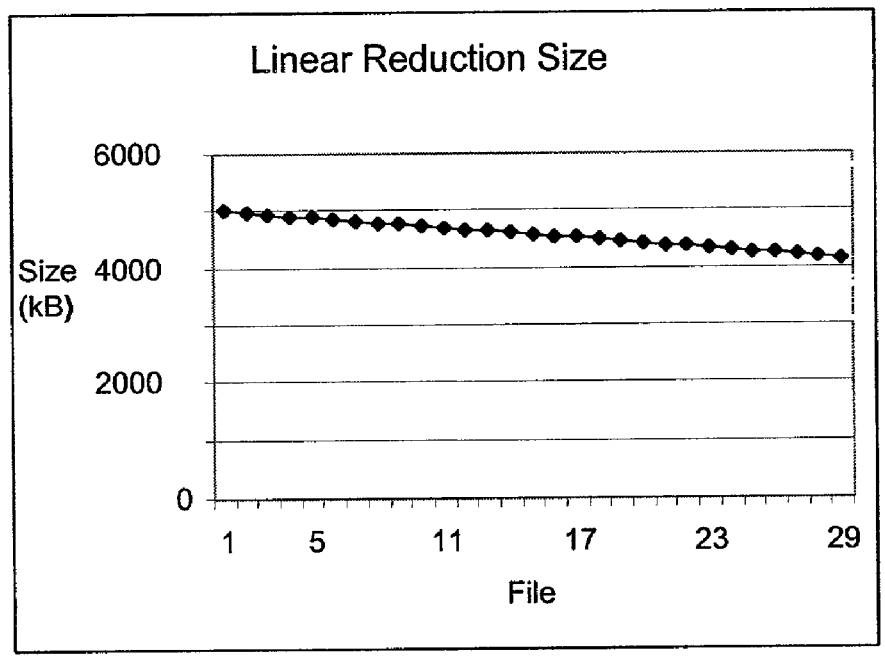
FIG. 7 is a graph illustrating a specific example of an algorithm for a linear reduction of the reduced file size.
Figure 8:
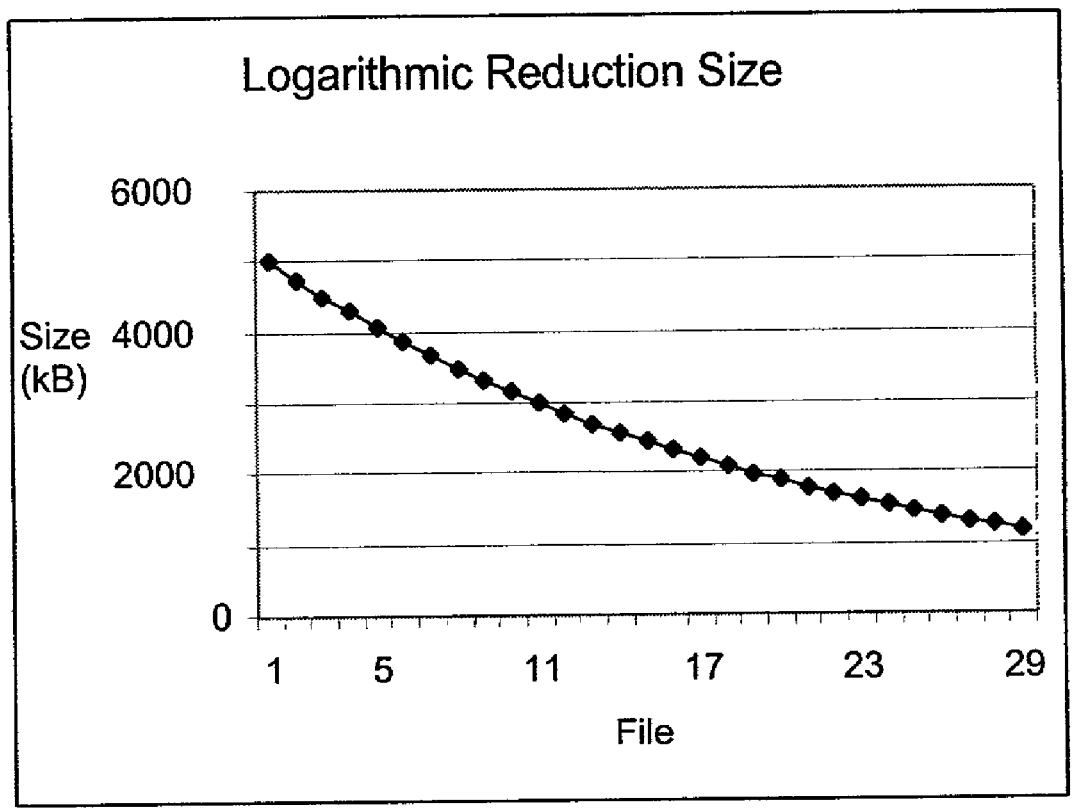
FIG. 8 is a graph illustrating a specific example of an algorithm for a logarithmic reduction of the reduced file size.

The size of the smaller size files can be either static or dynamic as determined by appropriate algorithms. The use of a predefined file size, i.e. static algorithm, is particularly useful for when the playback time of the file takes about as long as the download and conversion processes of subsequent files. FIG. 4 illustrates a graph of an example of predefined file size. Dynamic algorithms are desirable in many situations. For example, in a case where the file playback time takes longer than the download and conversion processes, then the method of providing sound files to the voice gateway may spend more time downloading and converting the files as time goes on. In such situations it can be important to start playing the initial part of the file for the user so that subsequent files can be downloaded. Many size-determining algorithms are suitable. For example, FIG. 5 illustrates an example of linearly increasing file size, while FIG. 6 illustrates an example of logarithmically increasing file size. In another example where the file playback time is shorter than the time necessary for both the download and the conversion processes, it may be desirable to reduce the file size as time goes on. A minimum file size will eventually be reached using this method to avoid eventually reaching a file size of zero. FIG. 7 illustrates an example of one possible algorithm for linearly decreasing file size and FIG. 8 illustrates an example of logarithmically decreasing file size.

In another embodiment, where the audio source is a very large audio file or a streaming feed, the process overwrites the oldest files with new data to create the new subsequent files.

Specific embodiments of a method and apparatus for providing a sound file to a voice gateway for coupling to a receiver via a voice based telephony connection, according to the present invention, have been described for the purpose of illustrating the manner in which the invention is used. It should be understood that the implementation of other variations and modifications of the invention and its various aspects will be apparent to one skilled in the art, and that the invention is not limited by the specific embodiments described. Therefore, it is contemplated to cover the present invention any and all modifications, variations, or equivalents that fall within the true spirit and scope of the basic underlying principles disclosed and claimed herein.

The invention claimed is:

1. A method of providing a sound file having a preestablished sound file header to a voice gateway for coupling to a receiver via a voice based telephony connection, comprising the steps of:
    a) creating a predetermined number of empty smaller files;
    b) altering a size defining portion of the preestablished sound file header to reflect smaller size of the smaller files to generate smaller file headers, and attaching the smaller file headers to the empty smaller files;
    c) downloading sound data from the sound file into one of the empty smaller files to create a filled smaller sound file;
    d) converting the filled smaller sound file into a format usable by the voice gateway, to create a converted smaller file;
    e) substantially simultaneous with converting, downloading sound data from the sound file to fill a subsequent smaller file, and
    f) providing the converted smaller file to the voice gateway and providing the voice gateway with a play list file of information identifying each of the converted smaller files that are to be coupled to the gateway, the play list file transmitted separate from the converted smaller files.

2. The method of providing a sound file to a voice gateway as in claim 1 wherein the sound file is located on an Internet network or on a local Internet-connected electronic device.

3. The method of providing a sound file to a voice gateway as in claim 1 wherein the voice gateway is requested to wait for a predetermined period of time before coupling a first one of the converted smaller files to the receiver via the connection.

4. The method of providing a sound file to a voice gateway as in claim 1 wherein steps c), d), e) and t) are repeated.

5. The method of providing a sound file to a voice gateway as in claim 1 wherein the format of sound files usable by the voice gateway is μlaw.

6. The method of providing a sound file to a voice gateway as in claim 1 wherein the play list file also includes an order in which the smaller files are to be coupled to the voice gateway and a delay time.

7. The method of providing a sound file to a voice gateway as in claim 4 wherein a predefined file size is used whenever playback of the converted smaller file takes about as long as the download and the conversion processes.

8. The method of providing a sound file to a voice gateway as in claim 4 wherein the division of the sound file into smaller sound files is performed in accordance with an algorithm chosen to timely balance the playback of a reduced size file and the download and the conversion of the subsequent files.

9. The method of providing a sound file to a voice gateway as in claim 8 wherein the algorithm used to create the smaller files results in one of a linear growth, a linear reduction, a logarithmic growth, and a logarithmic reduction of the size of all subsequent files.

10. A method of providing a sound file having a preestablished header to a voice gateway for coupling to a receiver via a voice based telephony connection, comprising the steps of:
   a) creating a predetermined number of empty smaller size files and attaching the preestablished header having a modified size defining portion to reflect the smaller size;
   b) downloading sound data from the sound file into one of the empty smaller size files to create a filled smaller size file;
   c) converting the smaller size file to a format suitable for the voice gateway;
   d) downloading additional data from the sound file into a subsequent empty smaller size file substantially simultaneously with the converting step;
   e) providing the voice gateway with a play list file of information identifying each of the smaller size files to be provided to the gateway and transmitting the play list to the gateway separate from the smaller size files.

11. The method of providing a sound file to a voice gateway as in claim 10 wherein the converted smaller size file is provided to the voice gateway once the conversion is completed.

12. The method of providing a sound file to a voice gateway as in claim 10 wherein an old converted smaller size file is overwritten with new data while building a new file to conserve system space in an application server.

13. The method of providing a sound file to a voice gateway as in claim 12 wherein the voice gateway is informed of the overwriting process, so that new converted files are provided to the user instead of the old ones.

14. A communication system for providing a sound file having a preestablished sound file header to a voice gateway for coupling to a receiver via a voice based telephony connection, comprising:
   means for creating a predetermined number of empty smaller files;
   altering means for converting a size defining portion of the preestablished sound file header to create converted smaller files size headers, and attaching the converted headers to the empty smaller files;
   means for downloading sound data from the sound file into the empty smaller files to create filled smaller files;
   conversion means for rendering the filled smaller files into a format usable by the voice gateway to create converted files, while substantially simultaneously downloading sound data to fill subsequent smaller sound files; and
   communication means for providing the converted files to the voice gateway and for providing the voice gateway with a play list file of information identifying each of the converted files to be coupled via the connection and an order of their transmission before the converted files identified are coupled to the gateway.

15. A communication system for providing a sound file to a voice gateway for coupling to a receiver via a voice based telephony connection, as in claim 14 wherein the means for downloading overwrites old converted files with new data to build a new smaller size file.

16. A communication system for providing a sound file to a voice gateway for coupling to a receiver via a voice based telephony connection, as in claim 14 wherein the altering means processes the sound file header using a selected algorithm to divide the sound file into smaller size files to provide one of predefined file size, increasing file size, and decreasing file size.

17. A computer-readable medium having computer-executable instructions for performing a method of providing a sound file having a preestablished sound file header to a voice gateway for coupling to a receiver via a voice based telephony connection, the method comprising the steps of:
   creating a predetermined number of empty smaller files;
   altering a size defining portion the preestablished sound file header to reflect smaller size of the empty smaller files to generate smaller file headers, and attaching at least one of the smaller file headers to each of the empty smaller files;
   downloading sound data from the sound file into one of the empty smaller files to create a filled smaller file;
   converting the filled smaller file into a format usable by the voice gateway to create a converted file; and
   substantially simultaneous with converting, downloading sound data to fill a subsequent empty smaller file;
   providing the converted files to the voice gateway and providing the voice gateway with a play list file of information identifying each of the smaller converted files that are to be provided to the gateway, the play list file transmitted separate from the converted smaller files.

18. The computer-readable medium having computer-executable instructions for performing the method of providing a sound file to a voice gateway, as in claim 17 wherein the step of creating comprises using a selected algorithm to create smaller size files to provide one of predefined file size, increasing file size, and decreasing file size.

19. The computer-readable medium having computer-executable instructions for performing the method of providing a sound file to a voice gateway, as in claim 17 wherein the step of providing comprises overwriting an old converted file with new data to build a new filled smaller file.

20. A communication system for providing a sound file having sound file header to a voice gateway for coupling to a receiver via a voice based telephony connection, comprising:
   at least one processor programmed to create a predetermined number of empty smaller files, convert the sound file header to modify a size defining portion of the file headers to reflect the smaller files size, attach at least one of the smaller size file headers to the empty smaller files, fill one of the empty files with data from the sound file and render the resulting filled smaller file usable by the voice gateway while substantially simultaneously downloading sound data to fill subsequent empty smaller files; and
   communication channel coupled to the processor to provide a play list file of information identifying each file to be transmitted to the voice gateway and an order of transmission prior to providing the filled smaller files to the voice gateway.

21. A communication system for providing a sound file to a voice gateway for coupling to a receiver via a voice based telephony connection, as in claim 20 wherein the at least one processor overwrites old rendered files with new data to build a new filled smaller file.

22. A communication system for providing a sound file to a voice gateway for coupling to a receiver via based telephony connection, as in claim 20 wherein the least one processor processes the sound file header using a selected algorithm to create a sequence of sound file headers for empty smaller size files to provide one of predefined file size, increasing file size, and decreasing file size.

\* \* \* \* \*

UNITED STATES PATENT AND TRADEMARK OFFICE
CERTIFICATE OF CORRECTION

PATENT NO. : 7,046,771 B2 Page 1 of 1
APPLICATION NO. : 10/161124
DATED : May 16, 2006
INVENTOR(S) : Derek K. Dalrymple It is certified that error appears in the above-identified patent and that said Letters Patent is hereby corrected as shown below:

On the title page, in section (56) References Cited, under Foreign Patent Documents:
"WO    WO 00/3840    1/2000" should read --WO    WO 00/38340    6/2000--

In the claims:

Column 6, line 55, "t)" should read --f)--.

Column 7, line 27, "with the converting step;" should read --with the converting step; and--.

Column 8, line 41, "algorithm to create smaller" should read --algorithm to create empty smaller--.

Signed and Sealed this

Twenty-sixth Day of February, 2008

JON W. DUDAS
*Director of the United States Patent and Trademark Office*